US008971023B2

(12) United States Patent
Olsson et al.

(10) Patent No.: US 8,971,023 B2
(45) Date of Patent: Mar. 3, 2015

(54) WEARABLE COMPUTING DEVICE FRAME

(75) Inventors: Maj Isabelle Olsson, San Francisco, CA (US); Mitchell Joseph Heinrich, San Francisco, CA (US); Joseph John Hebenstreit, San Francisco, CA (US); John Lapetina, San Francisco, CA (US); Matthew Wyatt Martin, Ross, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 13/425,951

(22) Filed: Mar. 21, 2012

(65) Prior Publication Data

US 2013/0250503 A1    Sep. 26, 2013

(51) Int. Cl.
*H05K 5/00* (2006.01)
*H05K 7/00* (2006.01)
*G06F 1/16* (2006.01)
*G09G 5/00* (2006.01)

(52) U.S. Cl.
USPC .......................................... 361/679.03; 345/8

(58) Field of Classification Search
USPC .......................................... 361/679.03; 345/8
See application file for complete search history.

(56) References Cited

U.S. PATENT DOCUMENTS

| 4,867,551 | A |   | 9/1989  | Perera |
| D327,079  | S | * | 6/1992  | Allen ........................... D16/309 |
| D334,557  | S |   | 4/1993  | Hunter et al. |
| D337,320  | S |   | 7/1993  | Hunter et al. |
| 5,589,846 | A | * | 12/1996 | Kobayashi .......................... 345/8 |
| 5,757,339 | A | * | 5/1998  | Williams et al. .................. 345/8 |
| D402,651  | S |   | 12/1998 | Depay et al. |
| 5,991,085 | A | * | 11/1999 | Rallison et al. ............... 359/630 |
| D436,960  | S |   | 1/2001  | Budd et al. |
| 6,204,974 | B1|   | 3/2001  | Spitzer |
| D512,985  | S |   | 12/2005 | Travers et al. |
| 7,158,096 | B1|   | 1/2007  | Spitzer |
| D559,250  | S |   | 1/2008  | Pombo |
| D565,082  | S |   | 3/2008  | McClure et al. |
| D602,064  | S |   | 10/2009 | Mitsui et al. |
| 7,631,968 | B1|   | 12/2009 | Dobson et al. |
| 7,648,236 | B1|   | 1/2010  | Dobson |

(Continued)

FOREIGN PATENT DOCUMENTS

WO    2010092904 A1    8/2010

OTHER PUBLICATIONS

International Search Report and Written Opinion for Application No. PCT/US2013/022124 dated Jun. 26, 2013.

(Continued)

*Primary Examiner* — Anthony Haughton
(74) *Attorney, Agent, or Firm* — Lerner, David, Littenberg, Krumholz & Mentlik, LLP

(57) ABSTRACT

A device is configured to be worn on a user's head. In one aspect, the device includes a center frame support and first and second side arms. Each side arm has a first end connecting to the center frame support and a free end remote from the first end. The device also includes an extension arm that projects from one of the side arms in a direction proximate the center frame support. The extension arm is configured to present information to the user via a display device. The center frame support and the first and second side arms form a band worn on the user's head. In one embodiment, the free end of the first side arm is elongated relative to the free end of the second side arm to form an asymmetric U shape. In another embodiment, a removable or adjustable nose bridge couples to the center frame support.

16 Claims, 20 Drawing Sheets

(56) References Cited

U.S. PATENT DOCUMENTS

| | | |
|---|---|---|
| 7,663,805 B2 | 2/2010 | Zaloum et al. |
| 7,675,683 B2 | 3/2010 | Dobson et al. |
| 7,843,403 B2 | 11/2010 | Spitzer |
| 8,000,000 B2 | 8/2011 | Greenberg et al. |
| D646,316 S | 10/2011 | Zhao |
| 8,593,795 B1 * | 11/2013 | Chi ............ 361/679.03 |
| 2005/0219152 A1 | 10/2005 | Budd et al. |
| 2006/0017657 A1 | 1/2006 | Yamasaki |
| 2006/0119539 A1 * | 6/2006 | Kato et al. ............ 345/8 |
| 2009/0201460 A1 | 8/2009 | Blum et al. |
| 2010/0045928 A1 | 2/2010 | Levy |
| 2010/0073262 A1 * | 3/2010 | Matsumoto ............ 345/8 |
| 2010/0110368 A1 | 5/2010 | Chaum |
| 2010/0149073 A1 | 6/2010 | Chaum et al. |
| 2010/0157433 A1 | 6/2010 | Mukawa et al. |
| 2010/0188314 A1 * | 7/2010 | Miyake et al. ............ 345/8 |
| 2011/0213664 A1 | 9/2011 | Osterhout et al. |

OTHER PUBLICATIONS

International Search Report & Written Opinion for Application No. PCT/US2012/050690 dated Feb. 28, 2013.

* cited by examiner

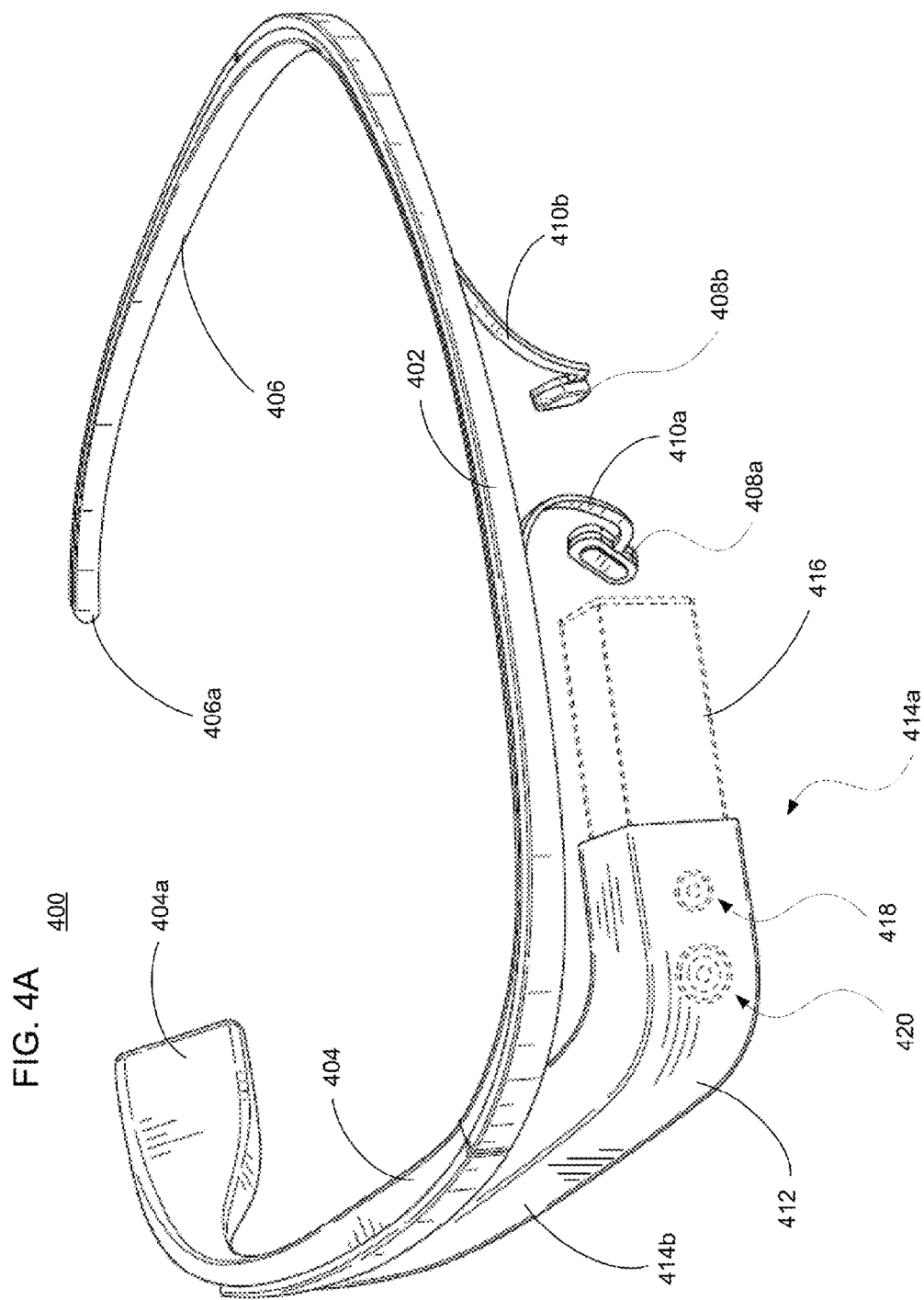

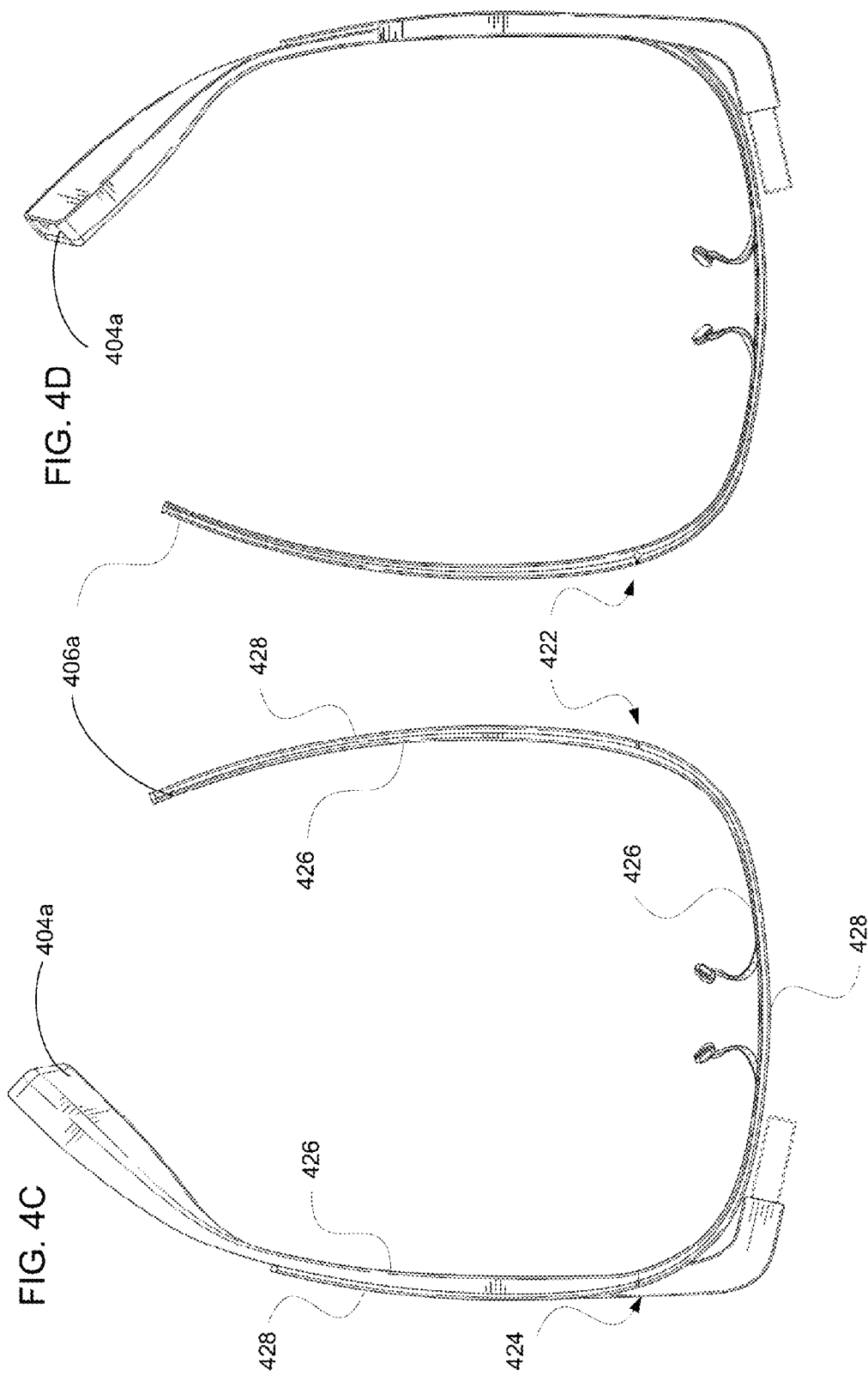

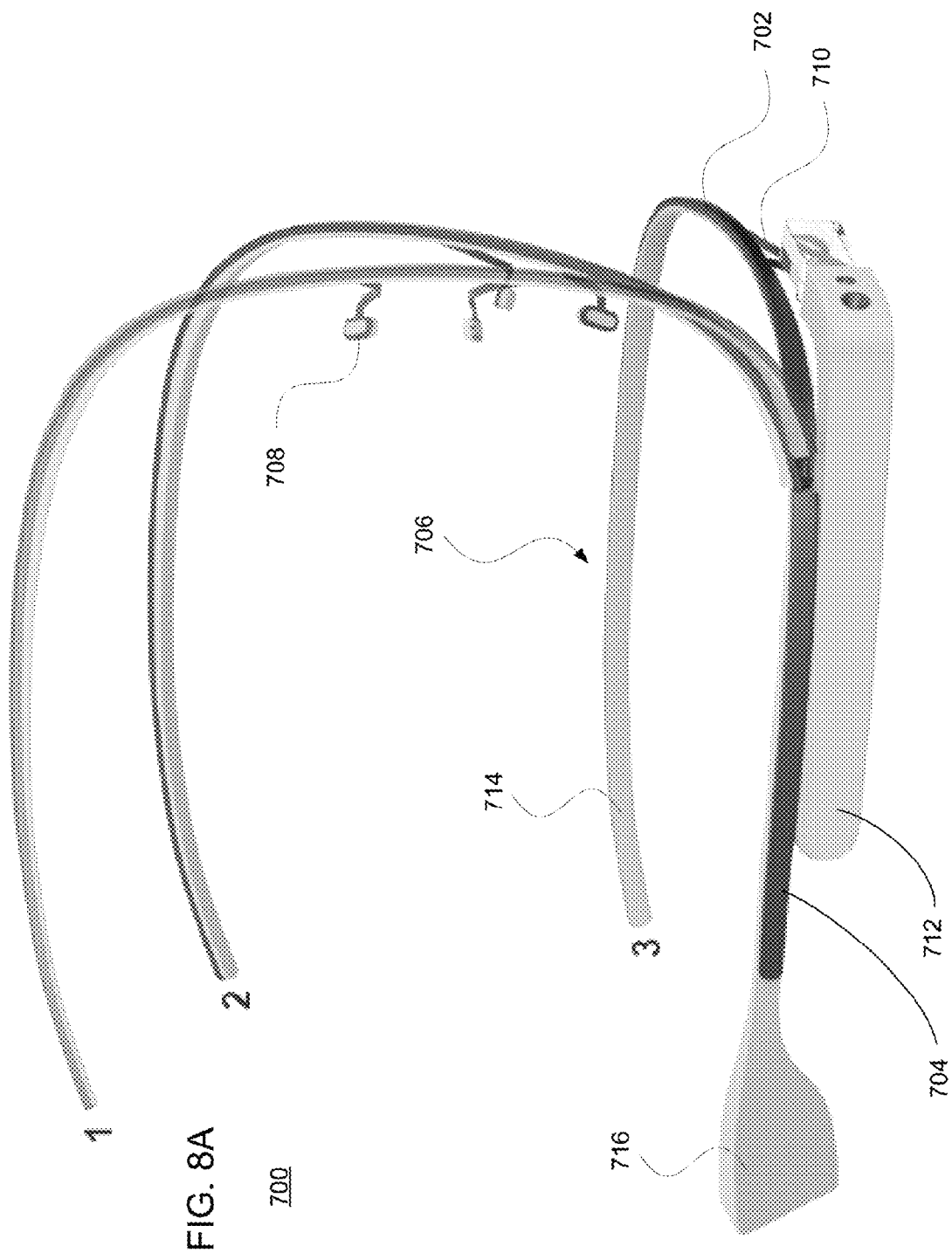

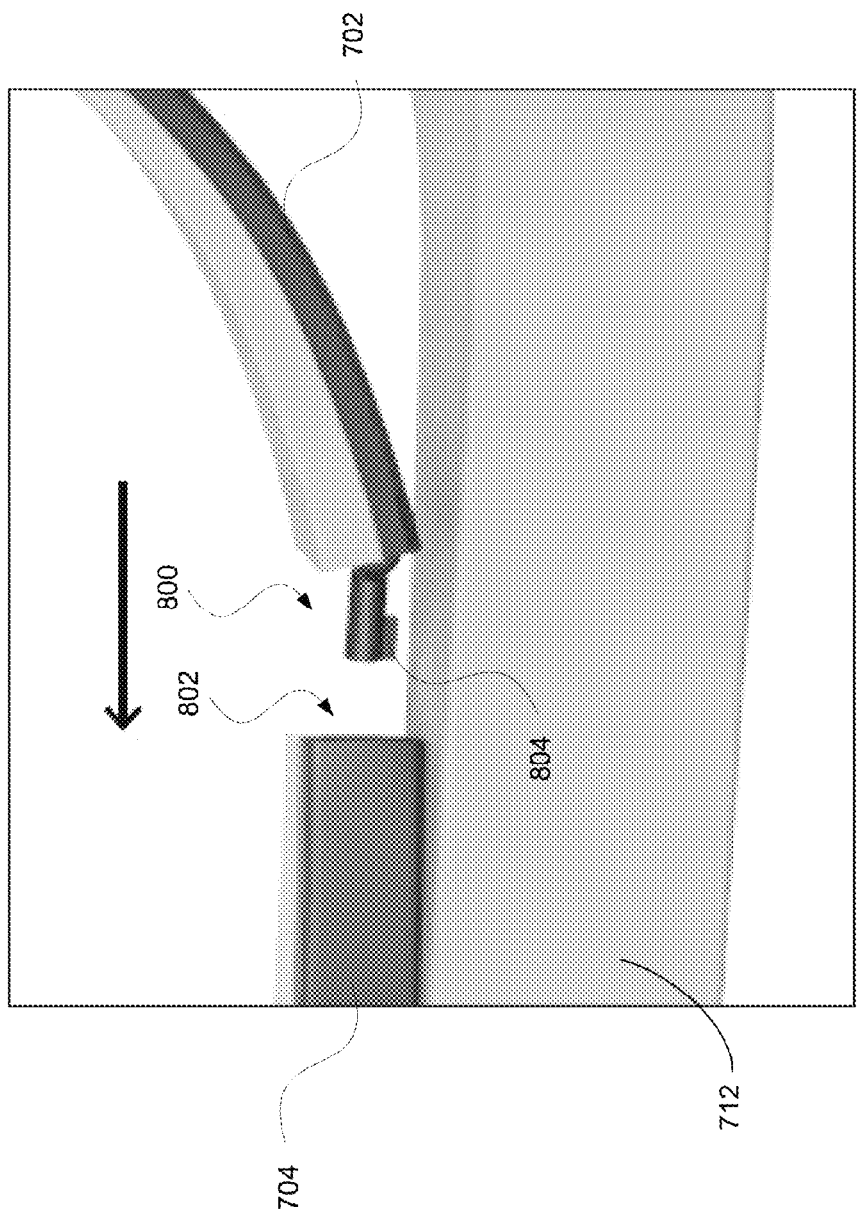

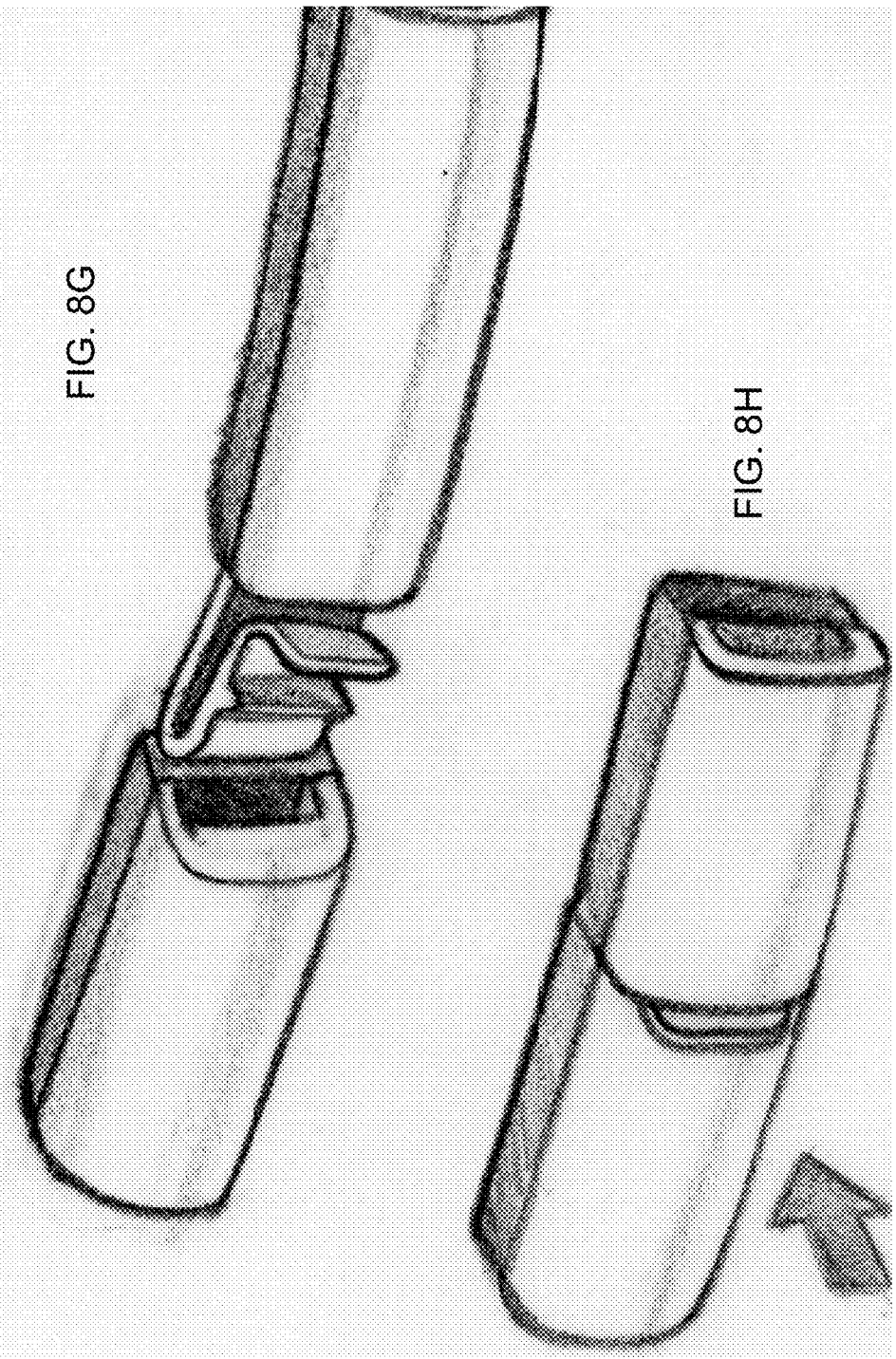

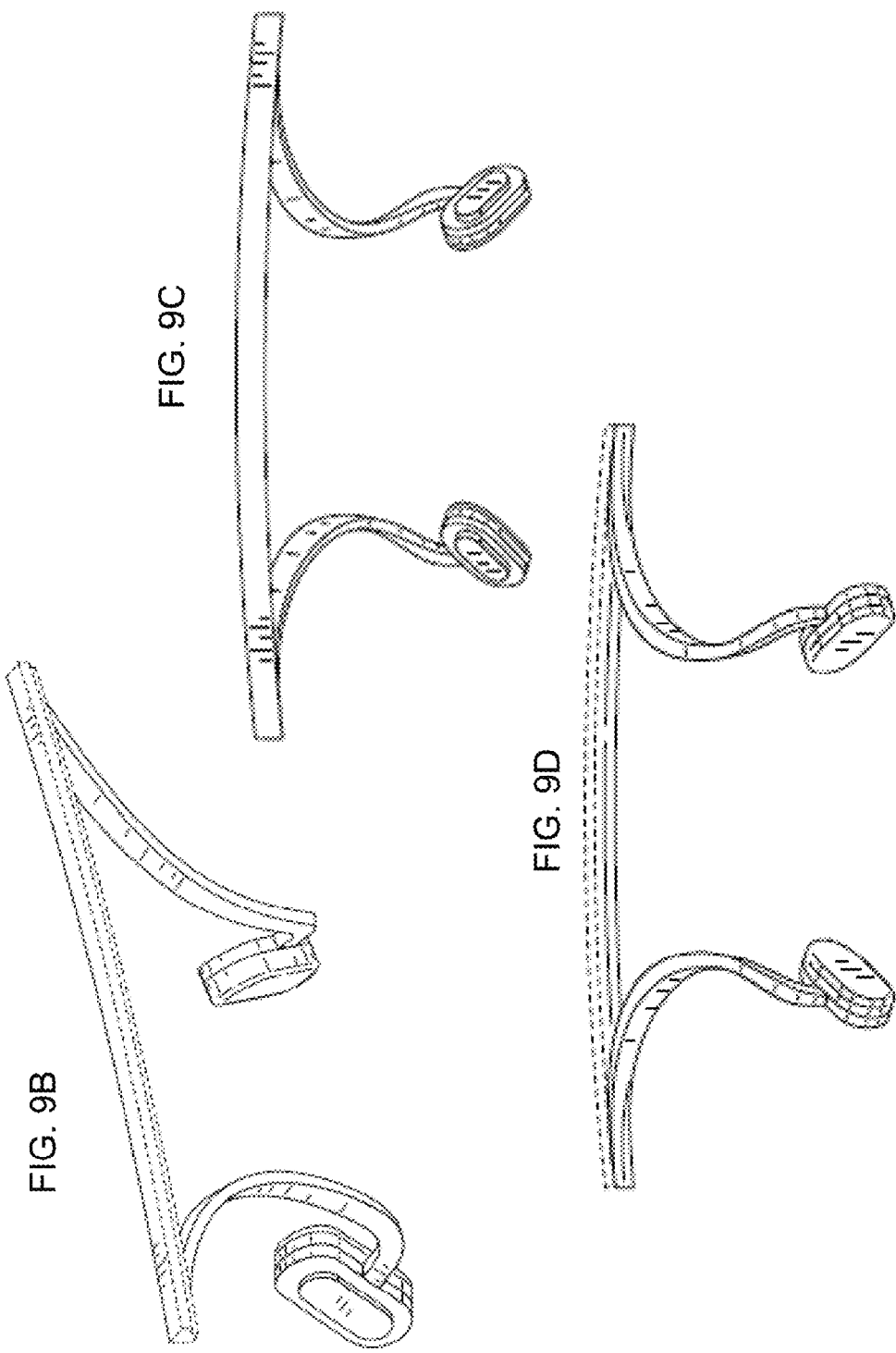

WEARABLE COMPUTING DEVICE FRAME

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as heads-up displays, wherein the image is displayed on, in, or through a transparent display that superimposes the displayed image over a view of the surrounding environment. These devices allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. However, the arrangements and functionality of such devices may be limited, failing to provide wearers with desired configurations.

SUMMARY

Aspects of the present disclosure relate generally to a wearable computing device. According to one aspect, a head-wearable device is provided. The device comprises a center frame support, a first side arm extending from a first end of the center frame support, a second side arm extending from a second end of the center frame support, and an extension arm projecting from one of the side arms in a direction proximate the center frame support. The extension arm is configured to present information to the user via a display device. The device further comprises a nose bridge including a cross piece and a pair of nose pads, where the cross piece is removably coupled to the center frame support.

In one example, the cross piece comprises a leaf spring member insertable into a receptacle of the center frame support. In another example, the nose bridge further includes an arm section, where the nose pads are removably connected to the arm section. In this case, the arm section may include a first arm and a second arm, with each nose pad being removably connected to the first or the second arm. Here, the first and second arms are ergonomically adjustable to change a relative position of the display device relative to an eye of the user.

According to another aspect, a head-wearable device comprises a center frame support, a first side arm having a first end extending from a first end of the center frame support and a free end remote from the first end, and a second side arm having a first end extending from a second end of the center frame support and a free end remote from the first end of the second side arm. The device also includes an extension arm projecting from one of the side arms in a direction proximate the center frame support. The extension arm is configured to present information to the user via a display device. The center frame support, the first side arm and the second side arm form a band to be worn on the user's head, and the free end of the first side arm is elongated relative to the free end of the second side arm to form an asymmetric U shape.

In one example, the asymmetric U shape is provided in multiple sizes, which are adapted to fit different ranges of head sizes. In another example, the free end of the first side arm is enlarged relative to the free end of the second side arm. Here, the enlarged free end houses at least one of circuitry and a power source employed by the display device.

In another example, the asymmetric U shape provides multiple points of contact for the user's head, and the free end of the first side arm provides a balancing weight relative to the extension arm. In this case, an ear of the user becomes a fulcrum about which the weight of extension arm is balanced against that of the free end of the first side arm.

In yet another example, the band includes a compliant inner portion and a resilient outer portion. The compliant inner portion is arranged to contact the user's head. In this case, the compliant inner portion may comprise a unitary material that lines an interior surface of the resilient outer portion.

Alternatively, the resilient outer portion associated with one of the first arm or the second arm is removably connected to the center frame support with a releasable interlocking connection means. 13. The device of claim 12, wherein the releasable interlocking connection means is engaged to secure the first arm or the second arm to the center frame support by rotatably inserting a key section of the center frame support into a receptacle of the first or the second arm. 14. The device of claim 13, wherein the other one of the first and second arms is secured to the center frame support by a threaded fastener.

According to another example, the resilient outer portion is elastically deformable to fit the user's head and is plastically deformable to allow the user to make adjustments to the shape of the band. In another example, one or both of the first and second arms is secured to the center frame support by a threaded fastener member, and the threaded fastener member is at least partly concealed by the compliant inner portion of the band.

In a further example, the device also comprises a nose bridge including a cross piece and an arm section. The arm section is configured to rest on the nose of the user. Here, the cross piece may be removably coupled to the center frame support. And in another example, the resilient outer portions of the first arm and the second arm are integrally formed with the center frame support as a single component.

According to yet another aspect, a modular kit for a head-wearable device is provided. The modular kit comprises a plurality of interchangeable band sections, with each band section including a center frame support and a first side arm having a first end connected to the center frame support. The modular kit also includes a second side arm having a first end configured for removable connection to a second end of each center frame support. The second side arm includes a free end remote from the first end of the second side arm. The kit also comprises an extension arm connectable to the second side arm, where the extension arm includes a display section configured to present information to the user via a display device. And the free end of the second side arm is elongated relative to a free end of each first side arm to form an asymmetric U shape.

In one example, the modular kit further comprises a plurality of interchangeable compliant members, with each compliant member being configured for connection to the interchangeable band sections. Each compliant member may be arranged to line an interior surface of the band section for contacting the user's head during wear.

In another example, the modular kit further comprises a plurality of interchangeable nose bridges. Each nose bridge includes a cross piece and an arm section. The arm section is configured to rest on the nose of the user. In this case, each nose bridge may further include a pair of nose pads, with the nose pads being removably connected to the arm section. Here, the nose pads of a given one of the interchangeable nose bridges may be selectable to match a color or style of a corresponding one of the interchangeable band sections.

BRIEF DESCRIPTION OF THE DRAWINGS

FIGS. 4A-D illustrate a wearable computing device in accordance with an example embodiment according to the disclosure.

FIGS. 8A-D illustrate a method for releasably connecting modular headgear according to an aspect of the disclosure.

FIGS. 8E-H illustrate an alternative method for releasably connecting modular headgear according to another aspect of the disclosure.

FIGS. 9A-D illustrate a nose bridge member according to aspects of the disclosure.

DETAILED DESCRIPTION

Figure 1A:
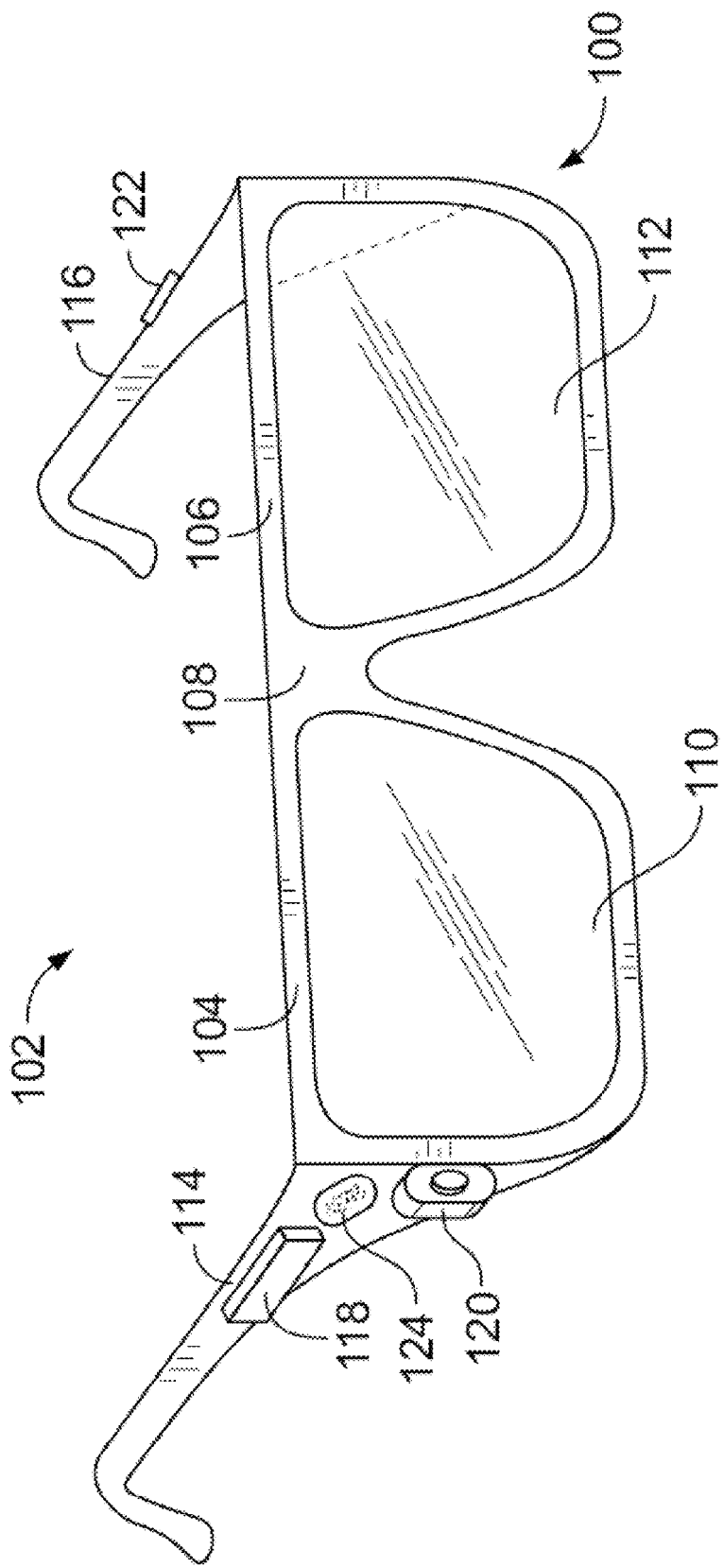
FIGS. 1A-B illustrate an example wearable computing system for receiving, transmitting, and displaying data.

Embodiments of the present disclosure are described herein with reference to the figures presented in the accompanying drawings. FIG. 1A illustrates an example system 100 for receiving, transmitting, and displaying data. The system 100 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 comprises frame elements including lens frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102. However, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102. However, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102. However, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities.

The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened 20 surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
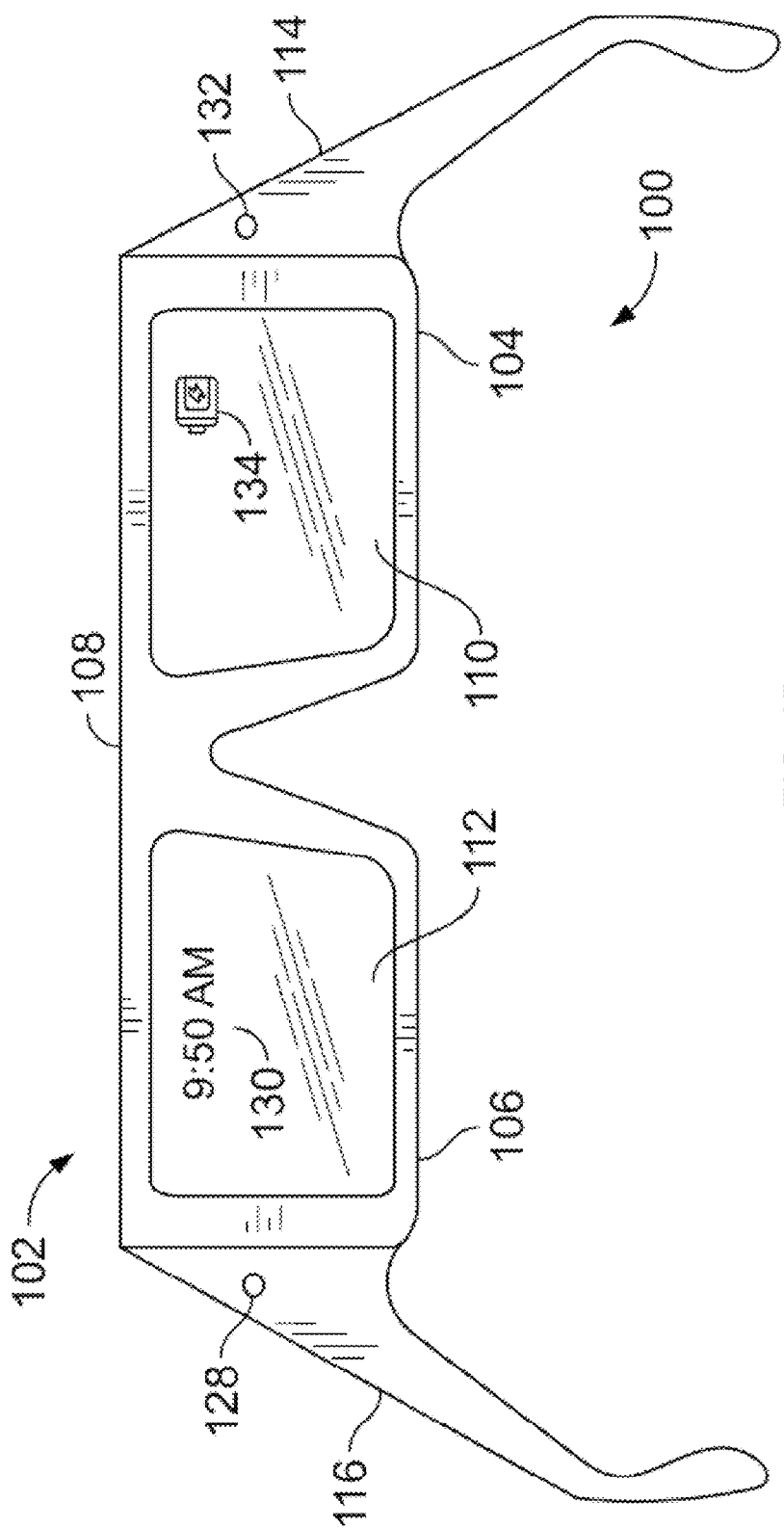

FIG. 1B illustrates an alternate view of the system 100 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 2A:
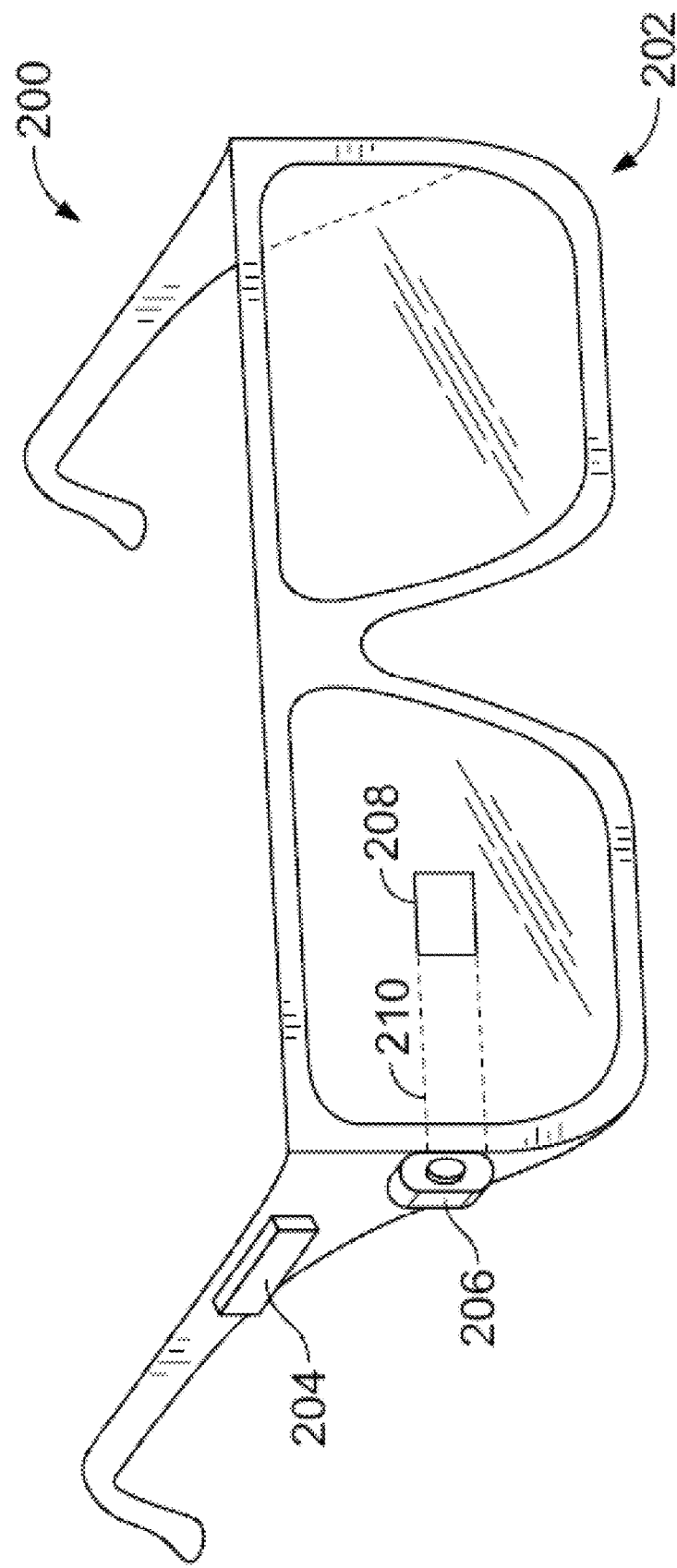
FIGS. 2A-B illustrate alternate examples of wearable computing systems.

FIG. 2A illustrates an example system 200 for receiving, transmitting, and displaying data. The system 200 is shown in the form of a wearable computing device 202. The wearable computing device 202 may include frame elements and side-arms such as those described with respect to FIGS. 1A-B. The wearable computing device 202 may additionally include an on-board computing system 204 and a video camera 206, such as those described with respect to FIGS. 1A-B. The video camera 206 is shown mounted on a frame of the wearable computing device 202; however, the video camera 206 may be mounted at other positions as well.

As shown in FIG. 2A, the wearable computing device 202 may include a single display 208 which may be coupled to the device. The display 208 may be formed on one of the lens elements of the wearable computing device 202, such as a lens element described with respect to FIGS. 1A-B, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 2B:
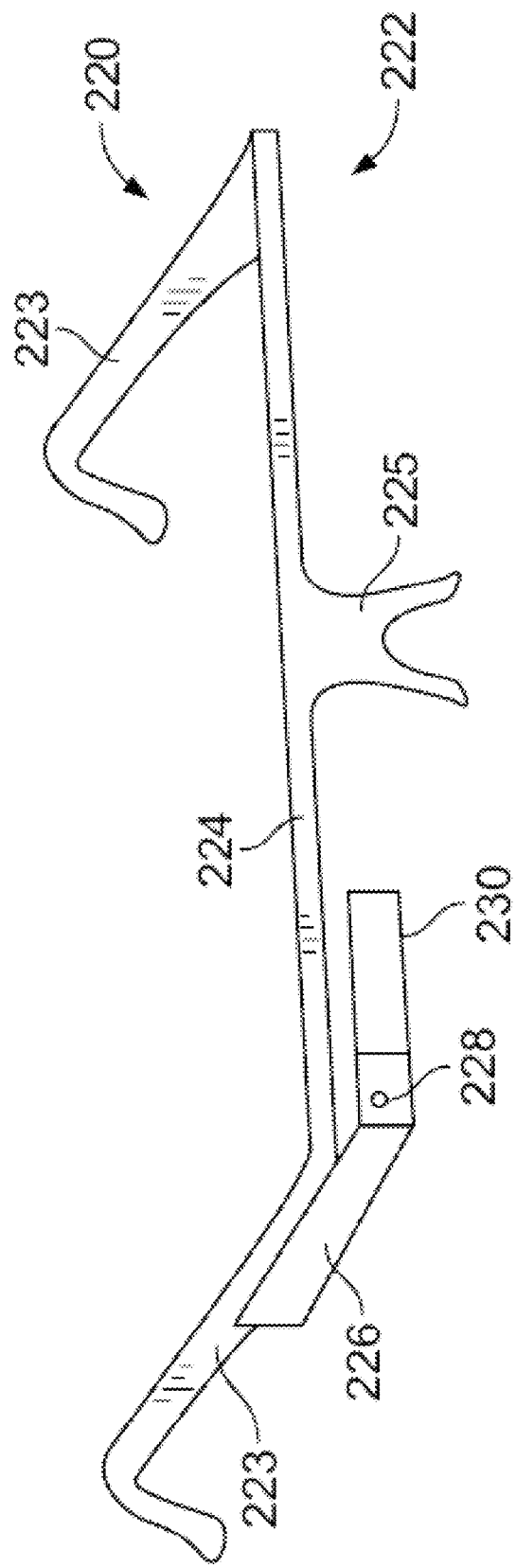

FIG. 2B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 2B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1A-B.

The wearable computing device 222 may include a single lens element 230 that may be coupled to one of the side-arms 223 or the center frame support 224. The lens element 230 may include a display such as the display described with reference to FIGS. 1A-B, and may be configured to overlay computer-generated graphics upon the user's view of the physical world. In one example, the single lens element 230 may be coupled to the inner side (the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 2B.

Figure 3:
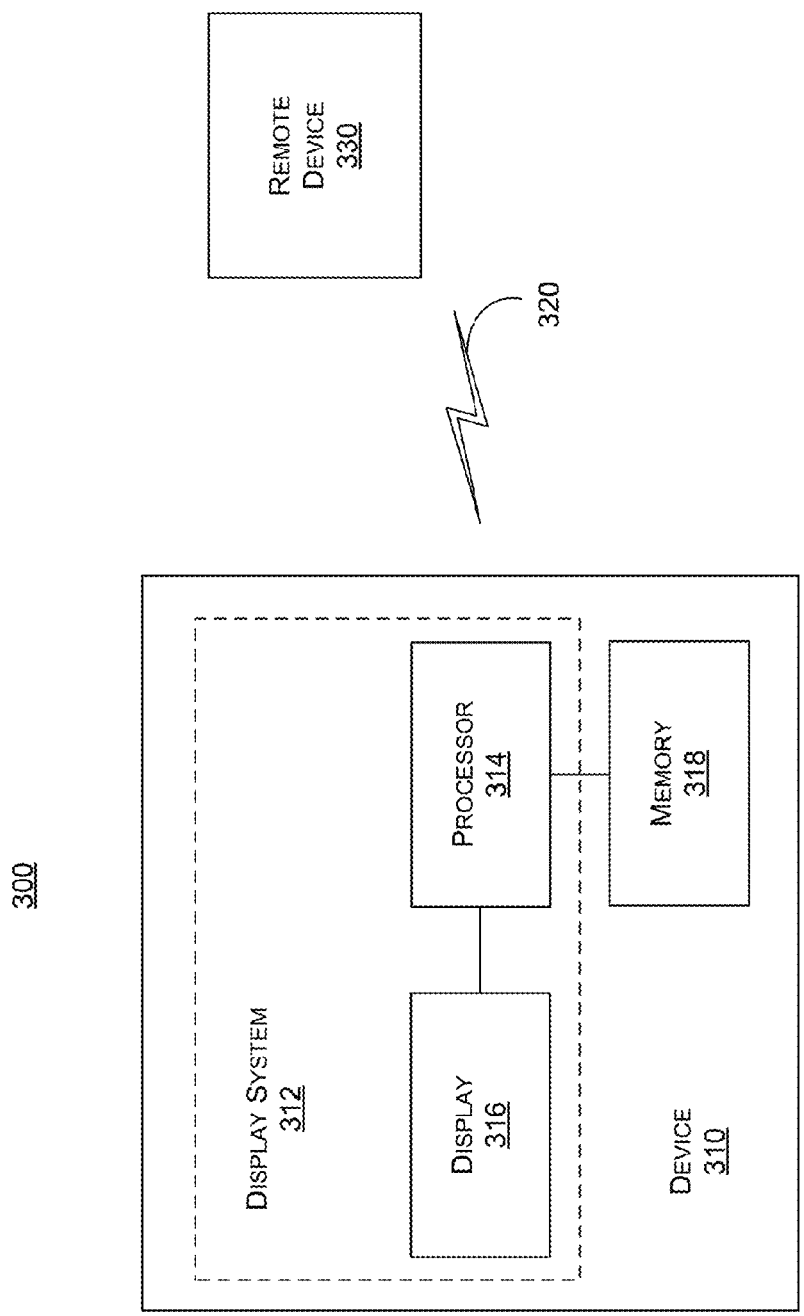
FIG. 3 illustrates an example schematic of a wearable computing system for use with aspects of the disclosure.

FIG. 3 illustrates a schematic drawing of an example computing system 300 for use with aspects of the disclosure. In the system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display system, such as the head-mounted device 102, 200, or 220 described with reference to FIGS. 1-2.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example. The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 3, the communication link 320 is illustrated as a wireless connection. However, wired (e.g., tethered) connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

FIGS. 4A-D illustrate an example system 400 for receiving, transmitting, and displaying data according to aspects of the disclosure. The system 400 is a wearable computing device and includes many of the same components included in the configurations described above. The system 400 includes a center frame support 402. Side arms 404 and 406 extend from opposite ends of the center frame support 402. The center frame support 402 and the side arms 404, 406 form a band worn on the user's head. Each side arm has a respective free end 404a, 406a. As shown, free end 404a may be enlarged to house circuitry and/or a power supply (e.g., removable or rechargeable battery) for the system 400.

As shown in FIG. 4A, a pair of nose pads 408a,b extends downward from the center frame support 402 via corresponding nose pad arms 410a,b. A generally L-shaped extension arm 412 extends from the side arm 404. The extension arm 412 includes an extension portion 414a and an attachment portion 414b. The extension portion 414b extends substantially along the side arm 404. The attachment portion 414a extends at an angle from the extension portion 414b such that the attachment portion 414a may be generally parallel to the center frame support 402.

A display 416 is attached to a free end of the attachment portion 414a such that the display 416 may be provided in the user's line of vision when the wearable computing device 400 is worn. A light pass hole 418 may be provided on the attachment portion 414a such that light from an LED or a flash is outwardly provided relative to a front of the user's head. An imaging device 420 such as a video or still image camera may also be provided on the attachment portion 414a.

As discussed above with regard to the video camera 120, the imaging device 420 may be forward facing to capture at least a portion of the real-world view perceived by the user. This forward facing image captured by the imaging device 420 may then be used to generate an augmented reality where computer generated images appear to interact with the real-world view perceived by the user. Although not shown in the figure, the light pass hole 418 and/or the imaging device 420 may be alternatively provided elsewhere along the center frame support 402, either side arm 404, 406, or the extension arm 412.

Figure 4B:
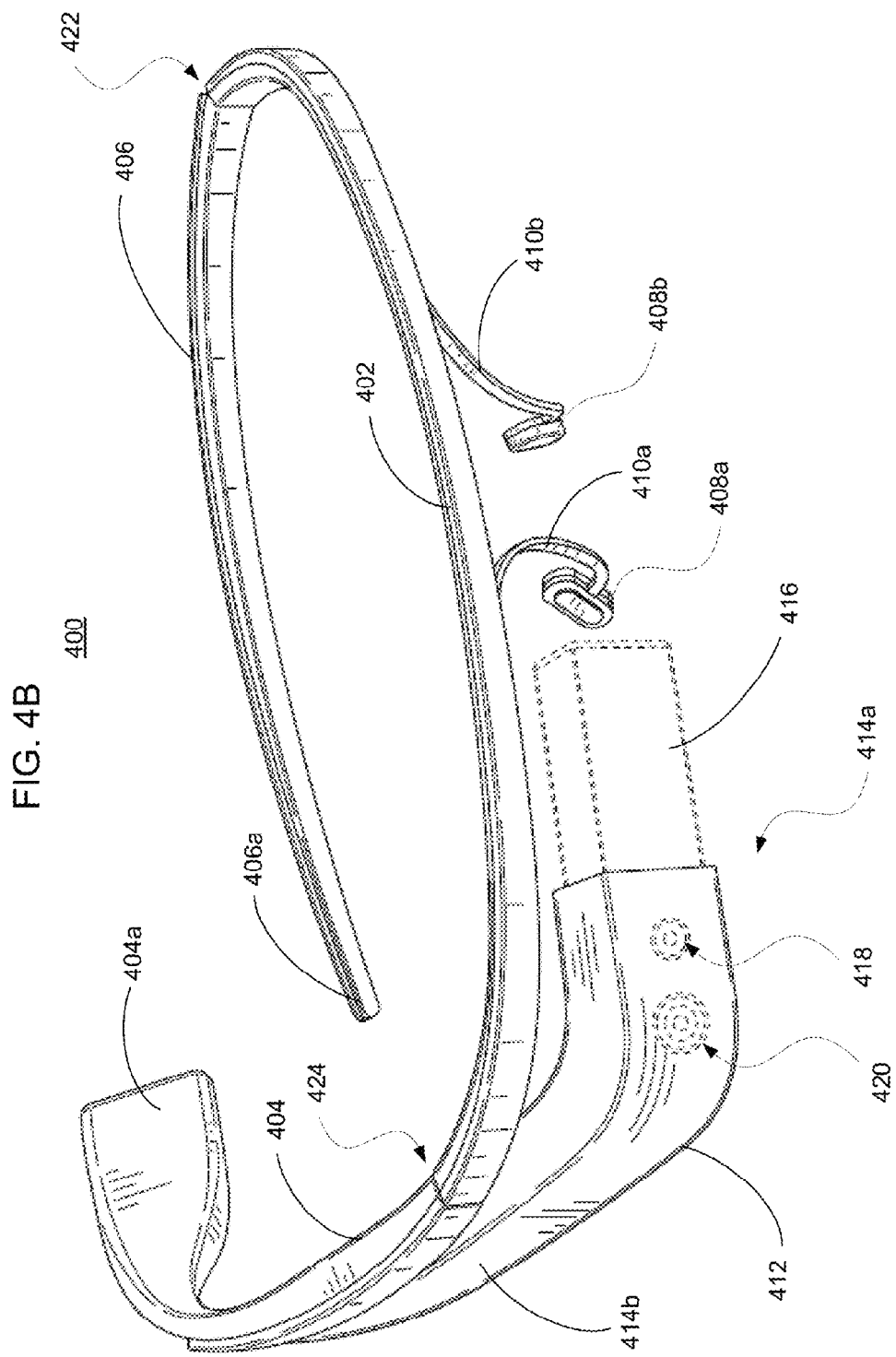

One or both of the side arms 404, 406 may be hingedly connected to the center frame support 402. FIG. 4B illustrates a view where the side arm 406 is folded inward relative to the center frame support 402 via hinge connection 422. As shown, the side arm 406 may be folded so that it is substantially parallel to the center frame support 402. A comparable hinge connection 424 may be provided between the side arm 404 and the center frame support 402. The top view of FIG. 4C and bottom view of FIG. 4D illustrate the hinge connection 422. The hinge connection 424 is shown in FIG. 4C but is obscured in FIG. 4D by the extension arm 412.

As shown in FIGS. 4C-D, the center frame support 402 and side arms 404, 406 may have a general "U" shape. In this example, the U shape is asymmetric. The asymmetry is due, in part, to the different configurations of the free end 404a, 406a of the side arms 404 and 406. The enlarged free end 404a may, as discussed above, be larger than free end 406a to house circuitry and/or a power supply. The configurations of the two free ends may be switched so that free end 406a houses circuitry and/or power supply equipment. The asymmetric shape may be configured to fit different ranges of head sizes, to accommodate different segments of the population. In one example, three different sizes (e.g., "small", "medium", and "large") may be provided to fit approximately 90% of the population. In another example, a single size may be employed. In either case, materials may be selected (e.g., titanium, heat treated stainless steel, polymers, composites) to obtain one or more shapes and sizes that fit some predetermined segment of the population.

The asymmetric configuration may create different points where the device fits on the wearer's head. Nonetheless, the device should be stable so that it does not move in an undesirable manner, for instance where the display moves up or down relative to the wearer's field of view. The free end 404a can be configured and positioned to provide a balancing weight relative to the extension arm 412. The extension arm 412 may be generally positioned such that its weight is focused forward of the user's ear, which can cause a portion of its weight to be supported over the brow of the user. By adding weight behind the user's ear (or shifting weight to behind the user's ear) in the form of the free end 404a, the ear becomes a fulcrum about which the weight of extension arm 412 is balanced against that of the free end 440a.

This can remove some of the weight on the user's brow, giving a more comfortable, and possibly a more secure fit with reduced potential slipping of the center frame support 402 downward on the user's brow. The components within the free end 404a, such as a battery or various control circuitry, can be arranged to contribute to a desired weight distribution for the overall assembly. For example, heavier components, such as a battery, can be placed toward or away from the display of the extension arm 412 to adjust the weight distribution. In one embodiment, a majority of the weight can be carried by the ear of the user, but some weight can still be carried by the brow in order to give the device a secure feel and to keep the center frame support 402 in a desired position on the brow to maintain a desired position for the display. In one example, between 55% and 90% of the weight of overall assembly can be carried by the user's ear.

FIGS. 4A-D also illustrate that the center frame support 402 and side arms 404, 406 of the band may include a compliant inner portion 426 and a resilient outer portion 428. The inner portion 426 can include any portions of the band that are intended to contact the user's head. In the particular example shown, inner portion 426 may comprise a unitary material that lines an interior surface of the center frame support 402 and side arms 404, 406. This may ensure that the compliant inner portion 426 makes contact with the user's head regardless of the area of band along which contact is made with the user's head. The compliant inner portion 426 may be made of any material that can provide a degree of compliance to enhance the comfort of the fit of band on the user's head while being able to retain its general shape.

Examples of such materials include various foams, such as foam rubber, neoprene, natural or synthetic leather, silicone and various fabrics. In one embodiment, the unitary material is made from an injection-molded or cast TPE. The compliance of the material of inner portion 426 may be measured by the durometer of the material. In an example, inner portion 426 can be made from a TPE having a durometer of between 30 and 70. Inner portion 426 can also be formed having a hollow passage therethrough or a channel formed therein. For instance, such a passage or channel can be used to route any wiring associated with extension arm 412 and display 416.

The outer portion 428 of the band can be made of a resiliently flexible material such as metal or plastic. In general, the nature of such a material should be such that outer portion 428 can maintain the desired shape for the band while allowing some flexibility so that band can adjust (e.g., expand) to fit on a user's head while applying a comfortable pressure thereto to help retain the band on the user's head. In some embodiments, outer portion 428 may be elastically deformable within a range that will allow it to be worn as such on a user's head and plastically deformable above the elastically deformable range to allow the user to make adjustments to the shape of the band.

In other embodiments, the outer portion 428 may be elastically deformable up to a sufficiently high threshold that a user is unable to permanently alter the shape of the band without employing tools or other equipment. Examples of materials for the resilient outer portion 428 include metals such as aluminum, nickel, titanium (including grade 5 titanium), various steels (including spring steel, stainless steel or the like), or alloys including these and other metals. As indicated above, plastics may also be employed. In another example, the frame may be made using carbon fiber, as this allows for optimization of material properties in different fiber orientations. The thickness of the outer portion 428 can be adjusted, depending on the material used, to give the desired flexibility characteristics.

Figure 5:
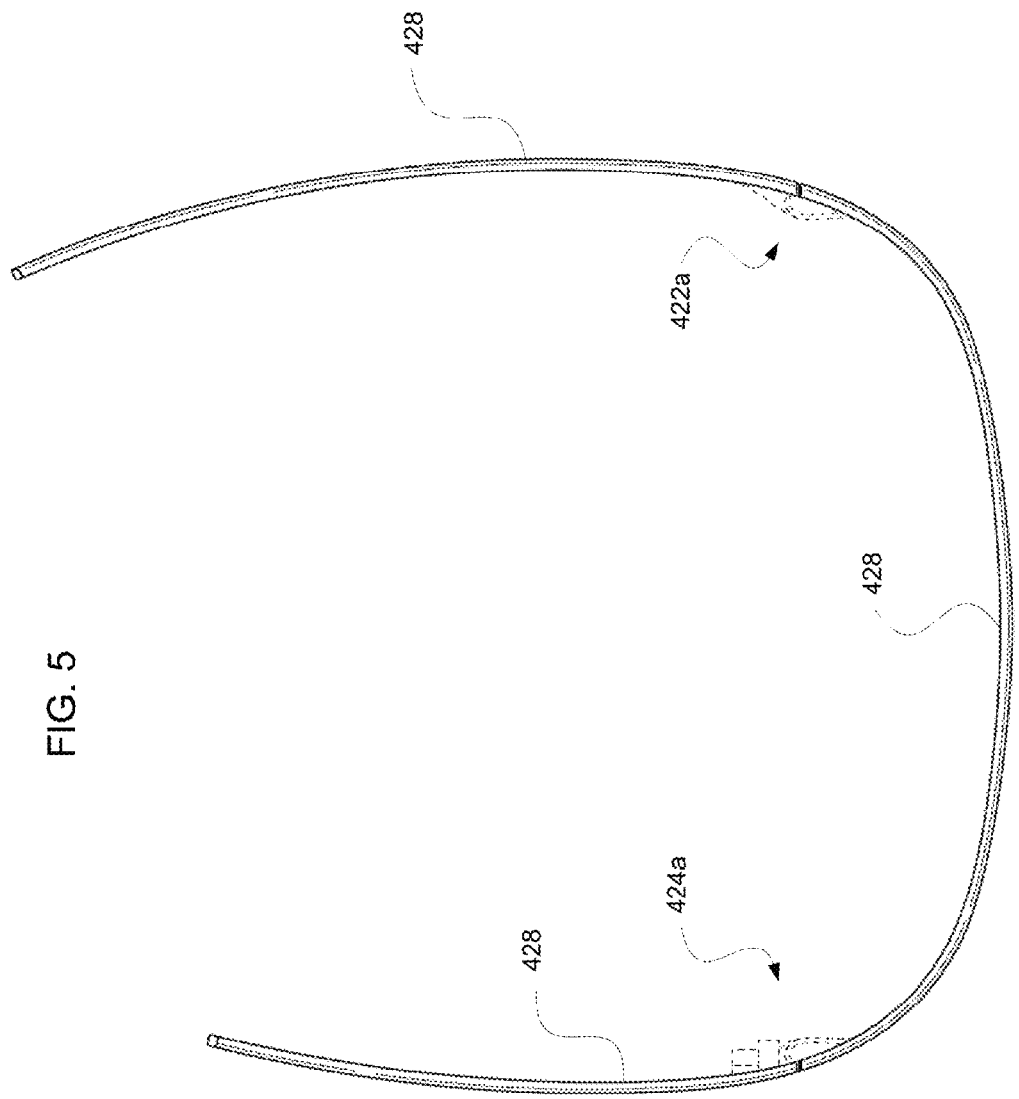
FIG. 5 illustrates a band section of a wearable computing device in accordance with an example embodiment.
Figure 6:
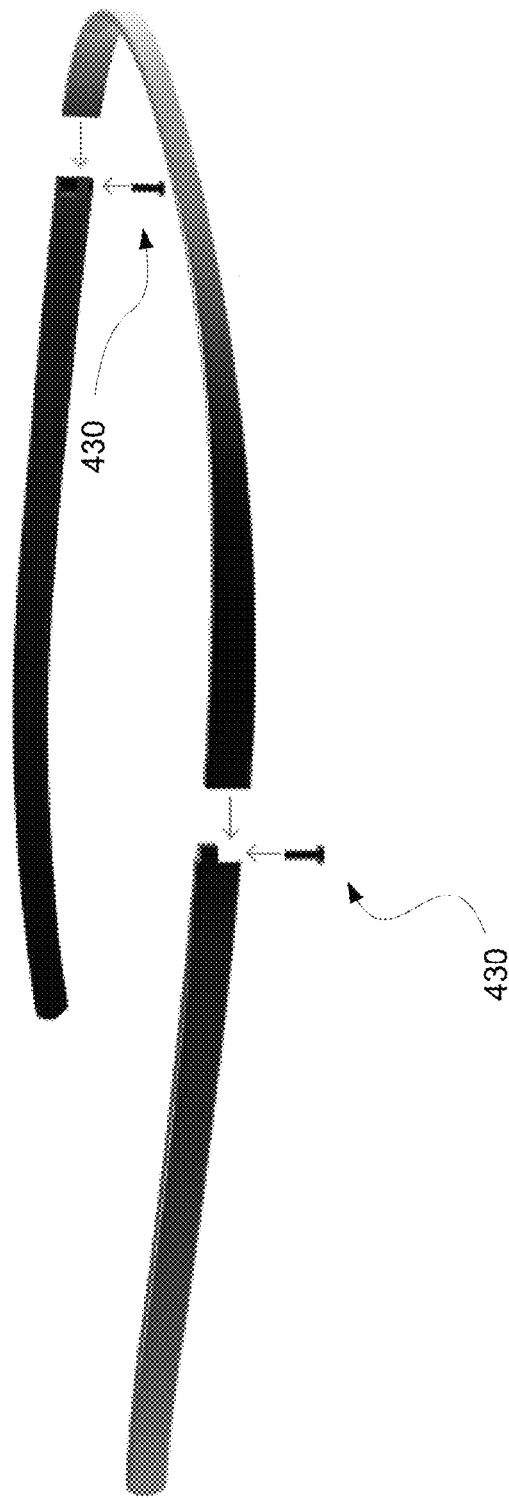
FIG. 6 illustrates an example fastening mechanism of the band section of FIG. 5.

The inner portion 426 may also be used to conceal the mechanisms of the hinge connections 422 and 424. FIG. 5 illustrates the resilient outer portion 428 of the band with the inner portion 426 omitted. This figure shows each section of the resilient outer portion 428 corresponding to the center frame support 402 and side arms 404, 406, as well as hinge members 422a and 424a. In one example, the hinge members 422a and 424a may each include a threaded fastener such as a screw 430, as shown in FIG. 6. In this example, each screw 430 is desirably inserted into a bottom of a threaded receptacle. When the compliant inner portion 426 is included in the band, it may at least partly cover the hinge connections, including the screws. This is shown in the top down view of FIG. 4C.

Figure 7A:
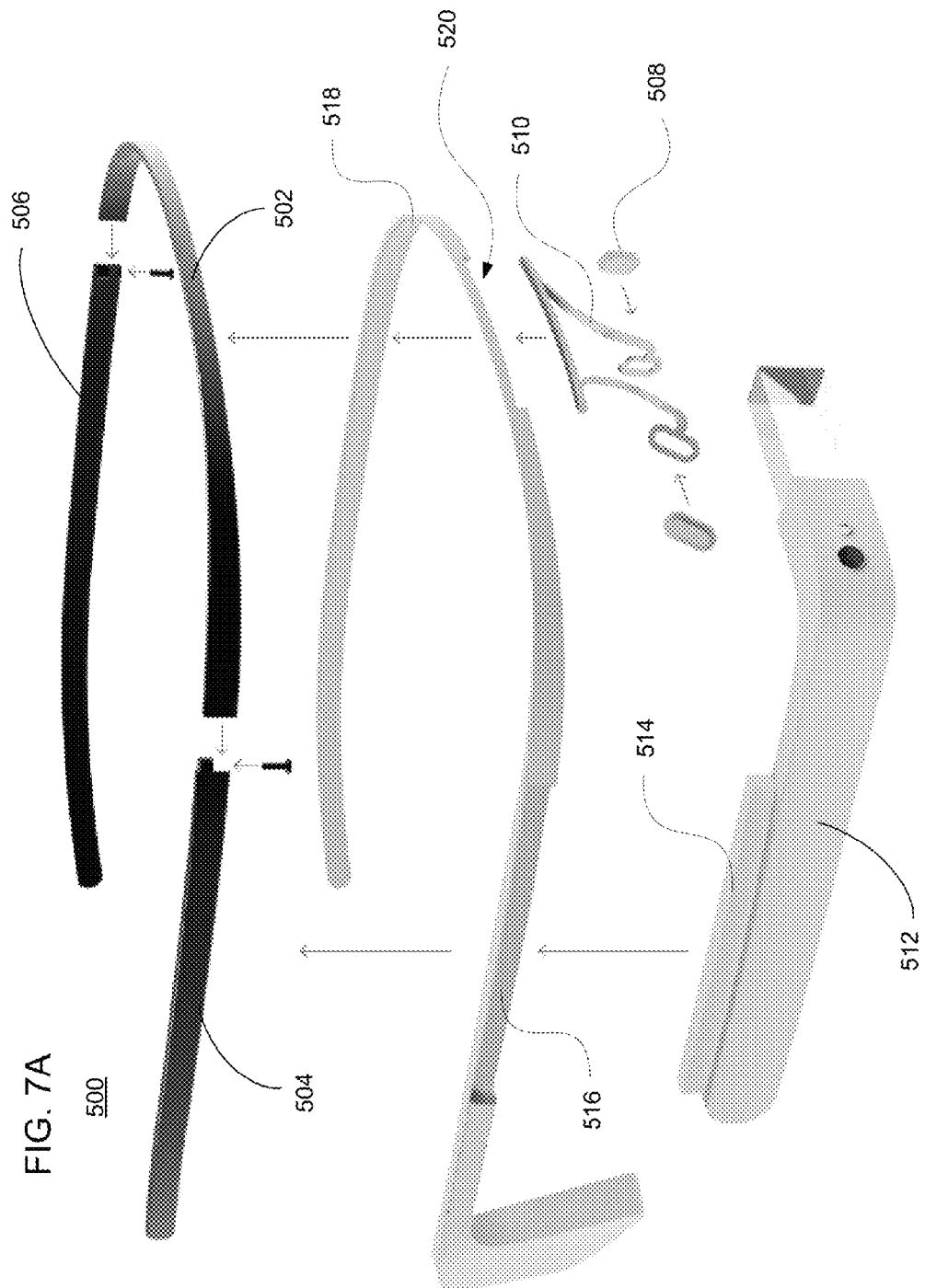
FIGS. 7A-B illustrate examples of modular wearable computing devices according to aspects of the disclosure.

Further embodiments are also possible wherein various extension arms and band components are interchangeable and can be individually sold as part of a modular system. Variations of the apparatus can be made available with bands offering different fit styles, colors, textures, etc. FIG. 7A illustrates one example of a modular system 500. The modular system 500 includes a center frame support 502. Side arms 504 and 506 extend from opposite ends of the center frame support 502. As with the examples of FIGS. 4-6, the center frame support 502 and the side arms 504, 506 form a band worn on the user's head.

Nose pads 508 may be removably coupled to the nose pad arm section 510. And generally L-shaped extension arm 512 extends from the side arm 504. The extension arm 512 may include a connection section 514 for coupling to a corresponding connection section 516 of a compliant inner portion 518. This may be done using various arrangements, e.g., using fasteners such as screws. Other embodiments may employ a snap connection that allows for easy removal without tools, or a keyed slot that allows the extension arm to slide into place relative to the side arm. The connection may include an electrical connection for the components of the extension arm 512 to receive power from a power supply (e.g., removable or rechargeable battery) maintained in the free end of side arm 504. The compliant inner portion 518 may also include a second connection section 520 configured to receive the nose pad arm section 510.

Figure 7B:
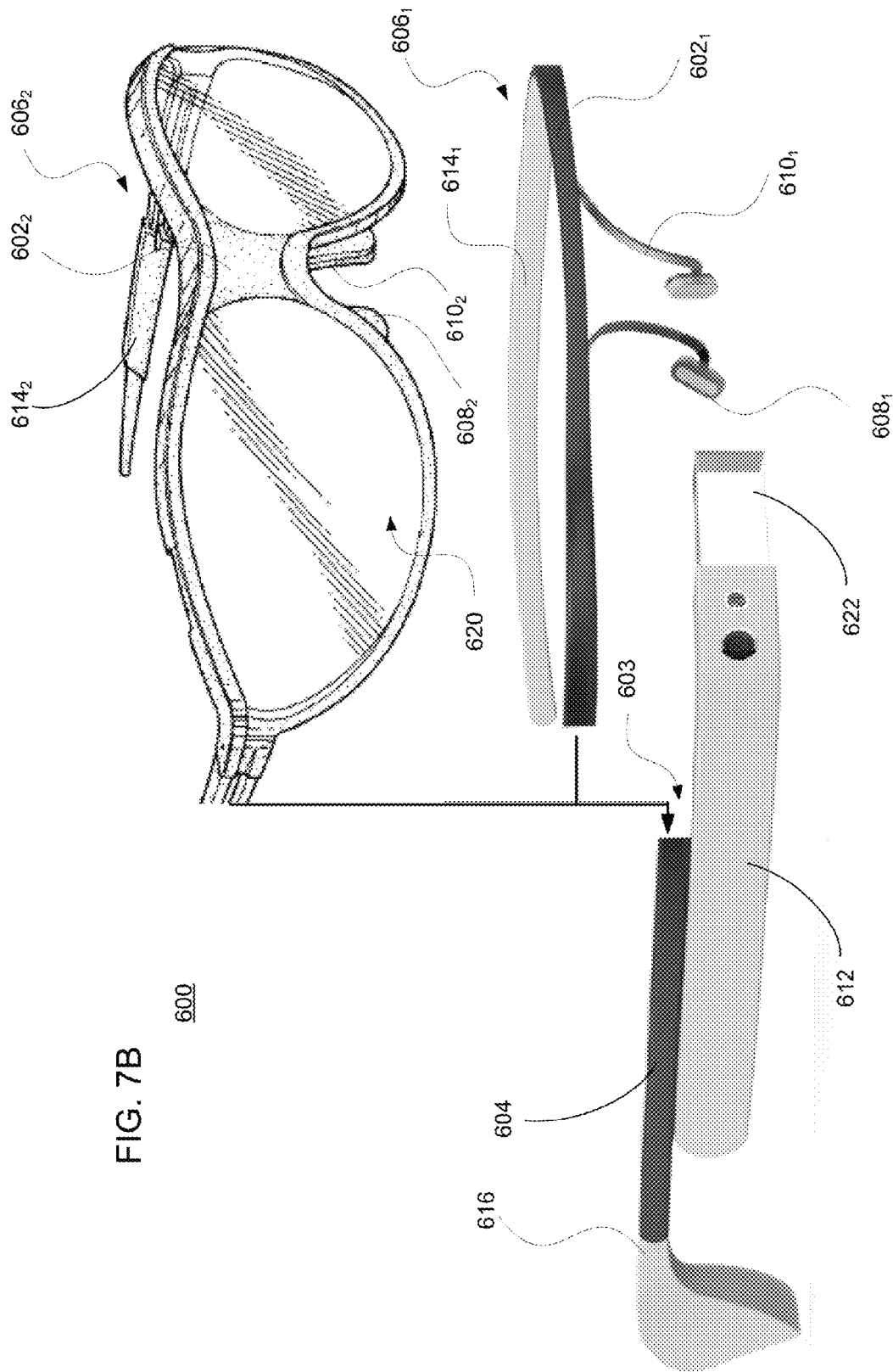

FIG. 7B illustrates an example of another modular system 600. In one configuration, the modular system 600 includes a center frame support $602_1$. One end 603 of side arm 604 is removably fastened to a first end of the center frame support $602_1$. Side arm $606_1$ couples to the other end of the center frame support $602_1$. Nose pads $608_1$ may be fixedly or removably coupled to the nose pad arm section $610_1$, which is connected to the center frame support $602_1$. And generally L-shaped extension arm 612 extends from the side arm 604. The extension arm 612 may be integral with or removably secured to the side arm 604. As shown, a compliant inner portion $614_1$ may be secured to the side arm $606_1$ (as well as to center frame support $602_1$) of the band. A second compliant inner portion 616 may be secured to the side arm 604.

In a second configuration, a different center frame support $602_2$ is coupled to side arm $606_2$ and is removably fastened to the first end 603 of the side arm 604. Nose pads $608_2$ may be fixedly or removably coupled to the nose pad arm section $610_2$, which is connected to the frame support $602_2$. As shown, a compliant inner portion $614_2$ may be secured to the side arm $606_2$ (as well as to frame support $602_2$) of the band. In this configuration, the frame support $602_2$ may also include a pair of lenses 620, such as prescription glasses or sunglasses. In one embodiment, a first one of the lenses 620 may be disposed behind display 622 (i.e., interposed between the display and the wearer's eye).

As discussed above, hinge members including threaded fasteners may be employed to secure the side arms to the center frame support. Such an arrangement may be employed with the modular systems of FIG. 7B. However, changing the band to accommodate either modular system by removing the threaded fastener may be undesirable in certain situations. If the threaded fastener is lost or damages, the apparatus may be unusable. Thus, alternative fastening mechanisms may also be employed.

FIGS. 8A-D illustrate a quick release fastening mechanism with an interlocking connection that requires no additional parts. As in the modular configurations above, modular system 700 may include a center frame support 702. A first end of side arm 704 releasably interlocks with a first end of the center frame support 702. Side arm 706 couples to the other end of the center frame support 706. This side arm may be fastened to the center frame support 706, or may be integrally formed therewith.

Nose pads 708 may be fixedly or removably coupled to the nose pad arm section 710, which is connected to the center frame support 702. And generally L-shaped extension arm 712 extends from the side arm 704. As discussed with regard to the examples above, the extension arm 712 may be integral with or removably secured to the side arm 704. As shown, a compliant inner portion 714 may be secured to the side arm 706 and center frame support 702 of the band. A second compliant inner portion 716 may be secured to the side arm 704.

Figure 8C:
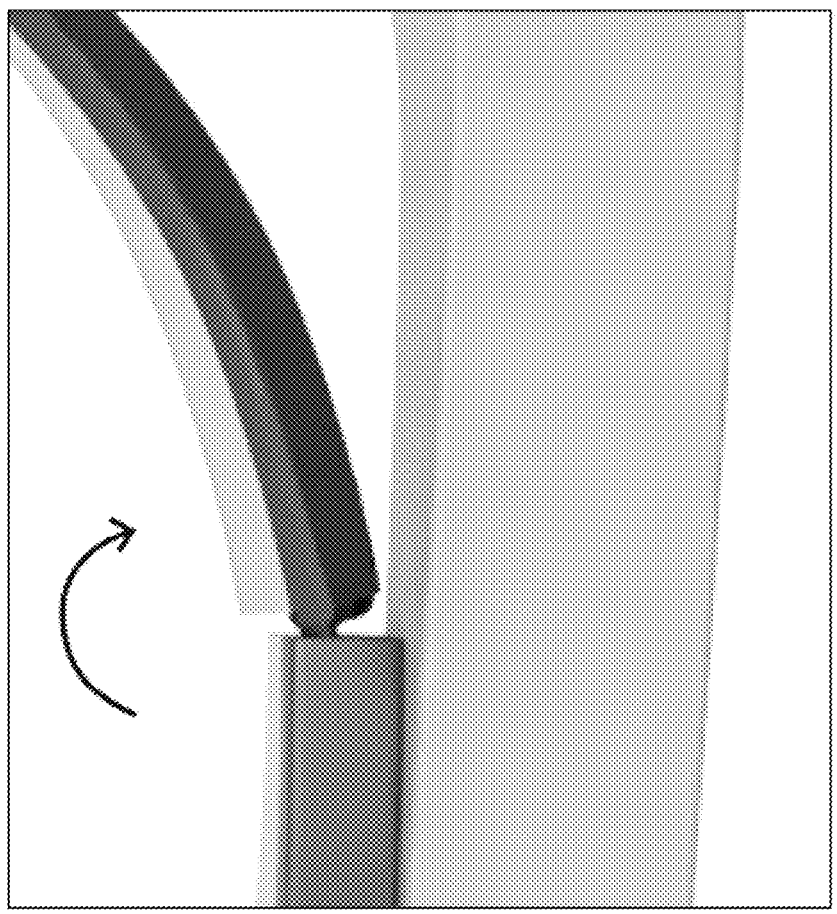
Figure 8D:
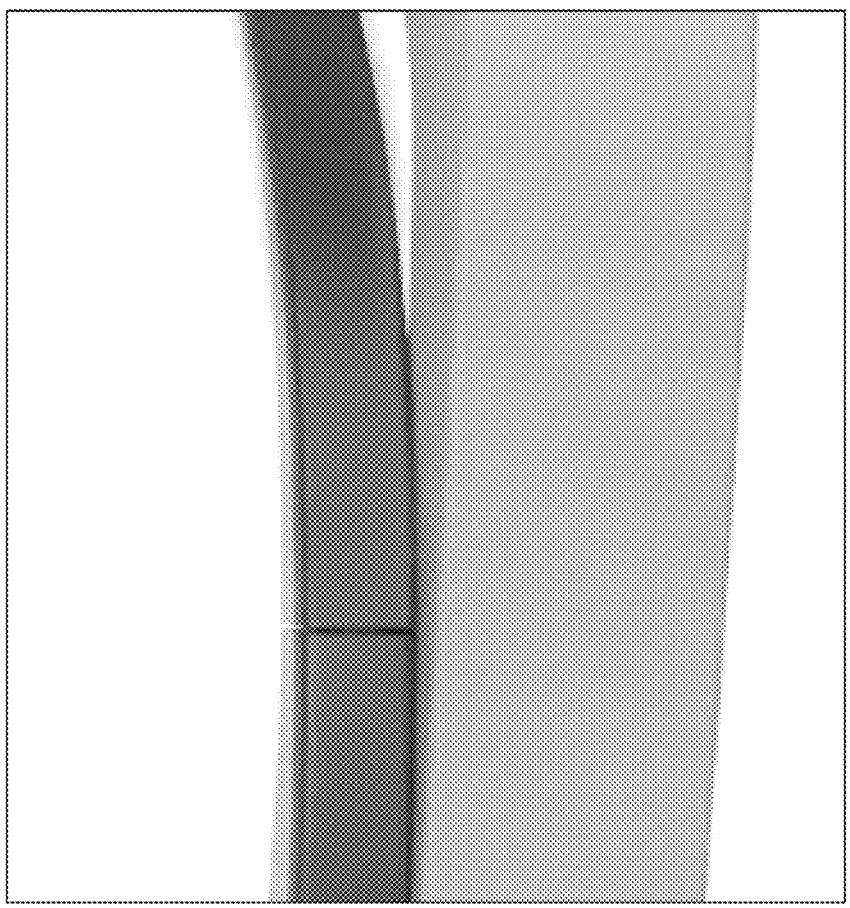

As illustrated in FIG. 8A, the portion of the band section including the center frame support 702 and the side arm 706 may be removably connected to the side arm 704 in a multi-step process. FIGS. 8B-D illustrate the process for connecting the components together. As shown in FIG. 8B, the center frame support 702 may include a locking member 800, which is configured to fit within receptacle 802 of the side arm 704. The locking member 800 may be arranged as a key having one or more teeth 804. While not shown in this figure, the receptacle 802 in this example would be adapted to receive the one or more teeth 804. In order to connect the portions of the band section together, the locking member 800 is slid into the receptacle 802 as shown by the arrow.

As shown in FIG. 8C, the portion of the band section including the center frame support 702 and the side arm 706 is twisted or otherwise rotated relative to the side arm 704. This may be done so that the one or more teeth 804 are secured by a corresponding portion of the receptacle 802. In one example, the rotation may be on the order of 90°. Then as shown in FIG. 8D, one the rotation is complete, the portion of the band section including the center frame support 702 and the side arm 706 is secured to the side arm 704.

Figures 8E, 8F:
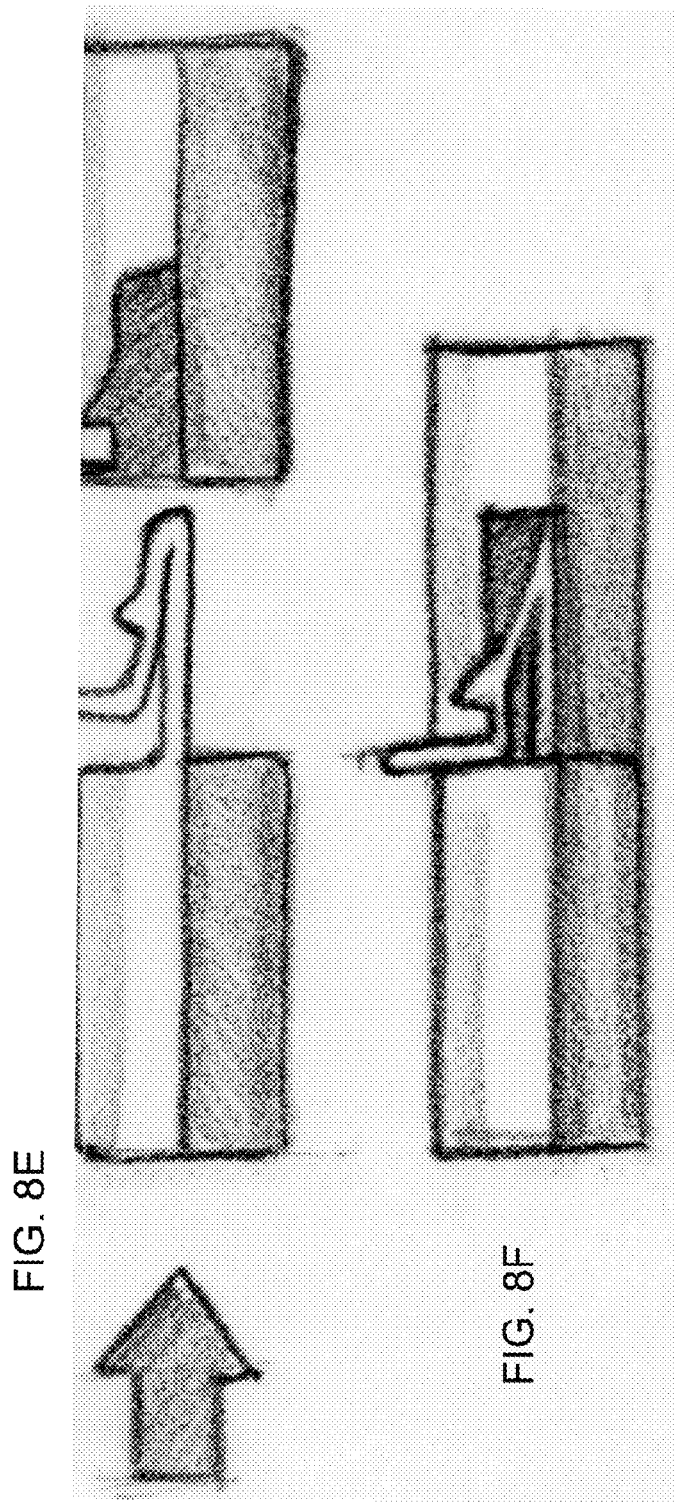

Other locking mechanisms may also be employed. In one alternative, magnets at the ends of the connecting sections of the center frame support 702 and the side arm 704 (or the extension arm) may be used to form the detachable connection for the band section. Yet another alternative is shown in FIGS. 8E-H. These figures show a spring flexure interlocking attachment mechanism that may be made of metal or other suitable material. As shown in FIGS. 8E and 8G, the spring flexure interlocking mechanism is configured for insertion into a receptacle. Once inserted, a releasable connection is made between the two members, as shown in FIGS. 8F and 8H. A tab or other portion can be used to easily and quickly release the attachment mechanism from the receptacle.

As discussed above with regard to FIG. 7A, the nose pads may be removably coupled to the nose pad arm section. This may be done for a variety of reasons. For instance, the nose pads may be replaced due to wear and tear. They may be removed for cleaning. The pads may also be replaced to change the style, shape and/or color of the pads. In this way, the pads can be selected to match other portions of the device. By way of example only, the extension arm or the compliant inner portion or the resilient outer portion of the band section may have a particular style or color scheme. The modularity of the overall frame, including the ability to connect different band sections together as described above, provides the user with the ability to personalize the device.

Figure 9A:
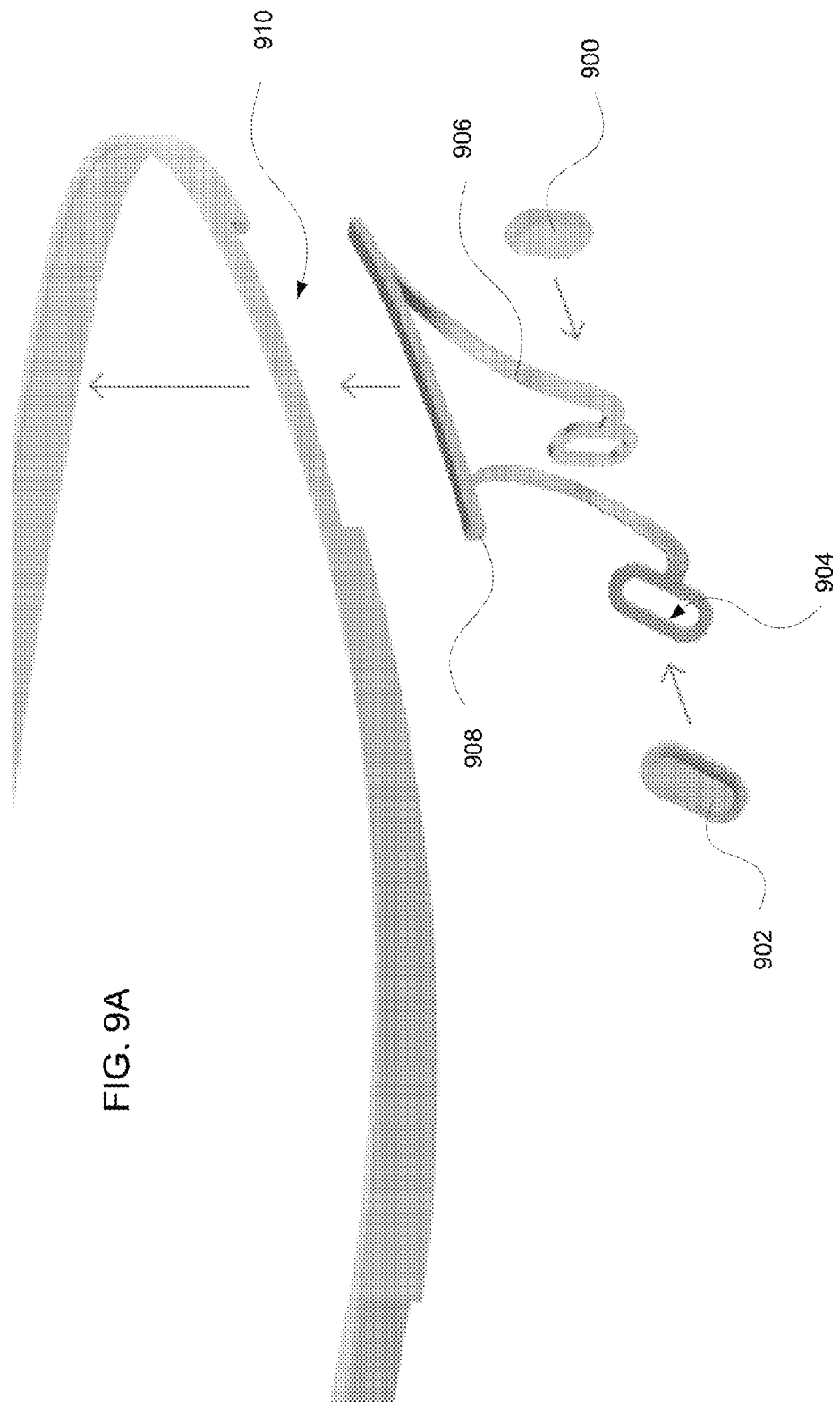

FIGS. 9A-D show the nose pads and the nose pad arm section (nose bridge) in more detail. The exploded view of FIG. 9A illustrates that each nose pad 900 may include a protrusion 902 adapted to fit within an opening 904 of the nose pad arm section 906. While two separate arm sections 906 of the nose bridge are shown coupled to a central crosspiece 908, the arm sections may, in an alternative, be directly coupled together as well as to the crosspiece 908. In another alternative, there may be one arm section arranged, e.g., in a general U shape with the ends having the openings 904 and the middle being coupled to the crosspiece 908. Regardless of the specific configuration of the nose bridge, in one example it is removably coupled to the center frame support of the device.

As shown FIG. 9A, the crosspiece 908 may be received by a connection section 910 of the band section. The connection section 910 may be part of a compliant inner portion or a resilient outer portion of the center frame support. The crosspiece 908 may be removably secured to the connection section 910 in different ways. In one example, the crosspiece 908 functions as a leaf spring. In this case, the user may pinch the ends of the crosspiece 908 inward while sliding them into receptacles of the connection section 910. Removal from the connection section 910 may be done by pulling a center portion of the crosspiece 908 away from the connection section 910 to disengage the ends from the receptacles. In another example, the crosspiece 908 may be secured to the connection section 910 by screws or other fasteners. And in other examples, the crosspiece 908 may be permanently affixed or integrally formed with the connection section 910 of the band. According to one alternative, the crosspiece is laser welded to the connection section. In another alternative, the crosspiece and connection section may be molded or otherwise fabricated as a unitary component.

The user may make adjustments to the nose bridge in order to achieve an ergonomic, comfortable fit, and to ensure that the display of the extension arm is properly visible when the device is placed on the wearer's head. In one example, the nose bridge may be formed from a flexible metal or alloy. In this case, the user may squeeze the arm sections or the nose pads themselves to adjust an image from the display higher in the person's field of view.

As these and other variations and combinations of the features discussed above can be utilized without departing from the scope of the claims, the foregoing description of exemplary embodiments should be taken by way of illustration rather than by way of limitation. It will also be understood that the provision of examples (as well as clauses phrased as "such as," "e.g.", "including" and the like) should not be interpreted as limiting; rather, the examples are intended to illustrate only some of many possible aspects.

The invention claimed is:

1. A head-wearable device, the device comprising:
a center frame support including a first interlocking mechanism;
a first side arm having a first front end extending from a first end of the center frame support and a free end remote from the first front end;
a second side arm having a second front end extending from a second end of the center frame support and a free end remote from the second front end of the second side arm;
a second interlocking mechanism positioned on the first front end of the first side arm or the second front end of the second side arm, the second interlocking mechanism being configured to rotatably interlock with the first interlocking mechanism of the center frame support;
an extension arm projecting from one of the side arms in a direction proximate the center frame support, the extension arm being configured to present information to the user via a display device;
wherein the center frame support, the first side arm and the second side arm form a band to be worn on the user's head, and the free end of the first side arm is elongated relative to the free end of the second side arm to form an asymmetric U shape.

2. The device of claim 1, wherein the asymmetric U shape is provided in multiple sizes, the multiple sizes adapted to fit different ranges of head sizes.

3. The device of claim 1, wherein the free end of the first side arm is enlarged relative to the free end of the second side arm, the enlarged free end housing at least one of circuitry and a power source employed by the display device.

4. The device of claim 1, wherein:
the asymmetric U shape provides multiple points of contact for the user's head; and
the free end of the first side arm provides a balancing weight relative to the extension arm.

5. The device of claim 4, wherein an ear of the user becomes a fulcrum about which the weight of the extension arm is balanced against that of the free end of the first side arm.

6. The device of claim 1, wherein the band includes a compliant inner portion and a resilient outer portion, the compliant inner portion being arranged to contact the user's head.

7. The device of claim 6, wherein the compliant inner portion comprises a unitary material that lines an interior surface of the resilient outer portion.

8. The device of claim 1, further comprising a releasable engagement mechanism configured to release the first interlocking mechanism from the second interlocking mechanism.

9. The device of claim 1, wherein the interlocking includes rotatably inserting a key section of the first interlocking mechanism into a receptacle of the second interlocking mechanism.

10. The device of claim 1, wherein at least one of the first side arm or the second side arm is secured to the center frame support by a threaded fastener.

11. The device of claim 6, wherein the resilient outer portion is elastically deformable to fit the user's head and is plastically deformable to allow the user to make adjustments to the shape of the band.

12. The device of claim 10, wherein:
the threaded fastener is at least partly concealed by a compliant inner portion of the band.

13. The device of claim 1, further comprising a nose bridge including a cross piece and an arm section, the arm section being configured to rest on the nose of the user.

14. The device of claim 13, wherein the cross piece is removably coupled to the center frame support.

15. The device of claim 6, wherein the resilient outer portions of the first arm and the second arm are integrally formed with the center frame support as a single component.

16. The device of claim 1, wherein the interlocking occurs when the center frame support and the first or second side arm engages and then rotates relative to each other.

* * * * *